(12) United States Patent
Lev

(10) Patent No.: US 7,755,548 B2
(45) Date of Patent: Jul. 13, 2010

(54) CABLE TENSION MECHANISM FOR AN ANTENNA

(75) Inventor: Jeffrey A. Lev, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 11/745,297

(22) Filed: May 7, 2007

(65) Prior Publication Data

US 2008/0278383 A1 Nov. 13, 2008

(51) Int. Cl.
*H01Q 1/24* (2006.01)
*H01Q 3/02* (2006.01)
(52) U.S. Cl. ...................... 343/702; 343/882
(58) Field of Classification Search ................. 343/702, 343/882, 900
See application file for complete search history.

(56) References Cited

U.S. PATENT DOCUMENTS 6,359,591 B1 * 3/2002 Mou ........................... 343/702

| 2002/0151328 | A1 | 10/2002 | Shin et al. |
| 2003/0125070 | A1 | 7/2003 | Wagner et al. |
| 2004/0140937 | A1 * | 7/2004 | Yang ........................ 343/702 |
| 2006/0082508 | A1 | 4/2006 | Doczy et al. |

FOREIGN PATENT DOCUMENTS

| KR | 20020009130 A | 2/2002 |
| KR | 20040103990 A | 12/2004 |

OTHER PUBLICATIONS

Kirby, Graham, "Integrating Bluetooth Technology into Mobile Products;" Intel Technology Journal Q2, 2000; 8 p.; Mobile Computing Group,Intel Corporation.
PCT International Search Report, mailed Oct. 28, 2008 (3 p.) for PCT/US2008/005636.
DE Office Action dated Mar. 17, 2010, pp. 3.

* cited by examiner

*Primary Examiner*—Shih-Chao Chen

(57) ABSTRACT

A system comprises a hinged antenna adapted to reside within a slot, an electrical cable connected to the antenna, and a cable tension mechanism. The cable tension mechanism receives the electrical cable from the antenna and pulls on the cable when the hinged antenna is in the slot and also when the hinged antenna is rotated to a deployed position at least partially outside the slot.

20 Claims, 3 Drawing Sheets

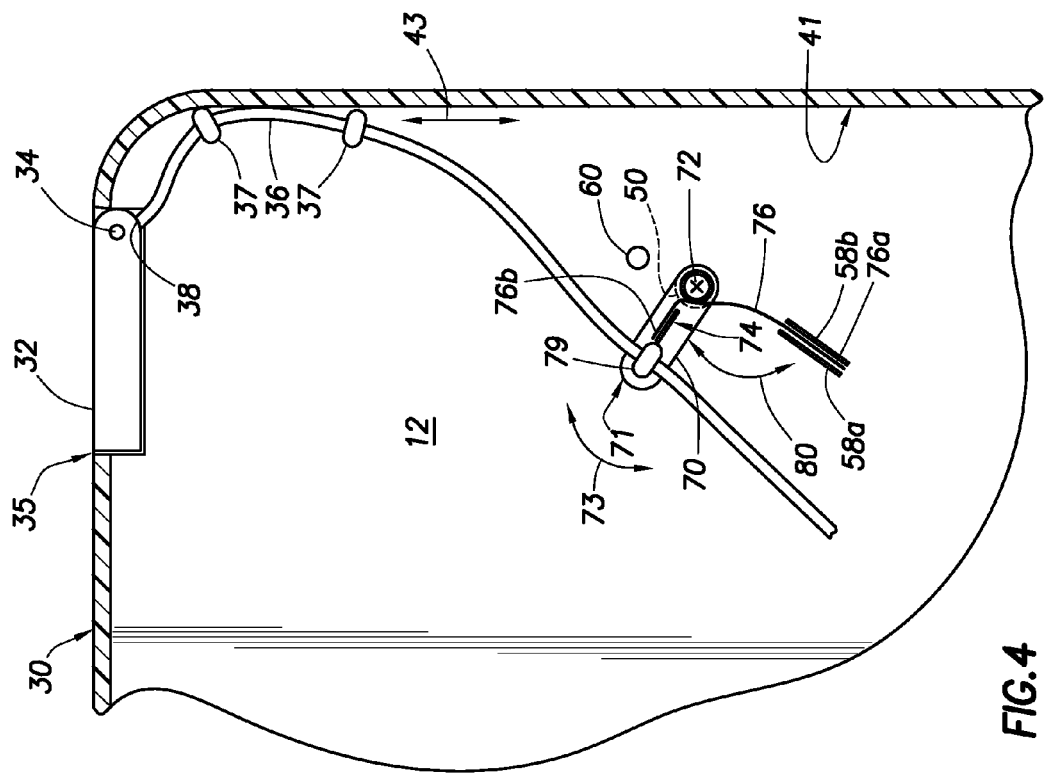
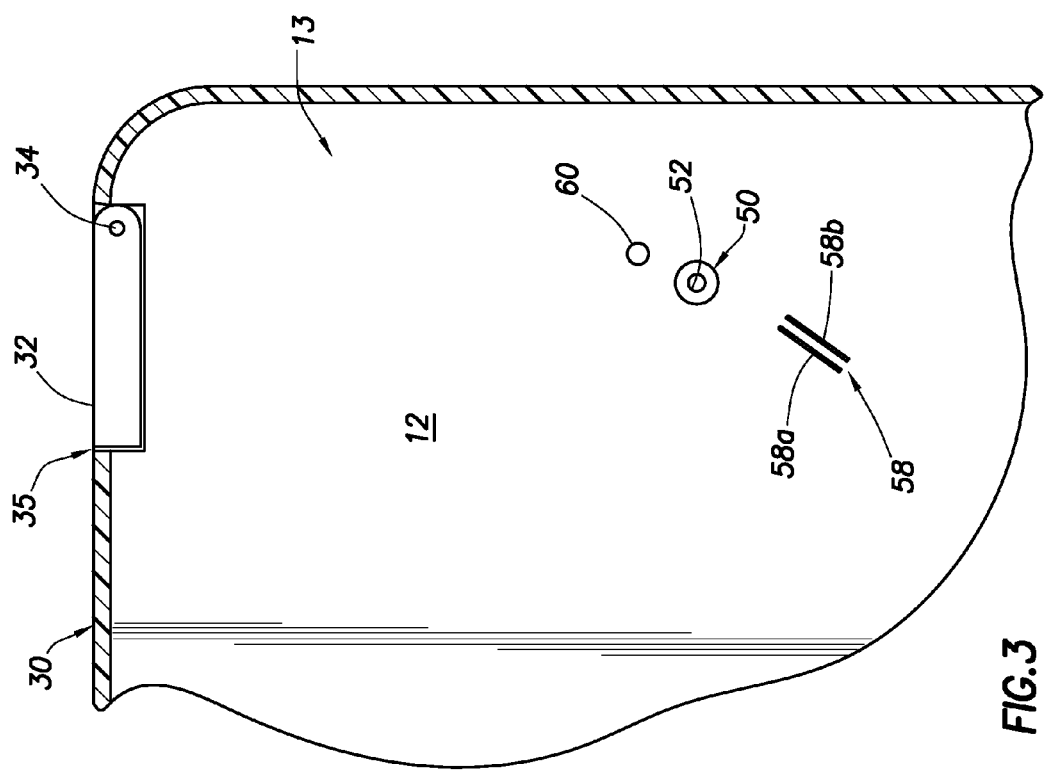

CABLE TENSION MECHANISM FOR AN ANTENNA

BACKGROUND

Many computers have wireless capability enabling wireless communication between the computer and other devices (e.g., access points, other computers, etc.). Such wireless communication is made possible using antennas. An antenna receives and/or transmits wireless communications using, for example radio frequency (RF) communication techniques.

An antenna is typically connected by an electrical cable to a transceiver. Some types of computers are portable and, due to space, weight and portability issues, the configuration, location and operation of an antenna must be carefully considered.

BRIEF DESCRIPTION OF THE DRAWINGS

For a detailed description of exemplary embodiments of the invention, reference will now be made to the accompanying drawings in which:

FIG. 3 shows detail of a portion of a cable tension mechanism in accordance with various embodiments; and FIGS. 4 and 5 show operation of the cable tension mechanism in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
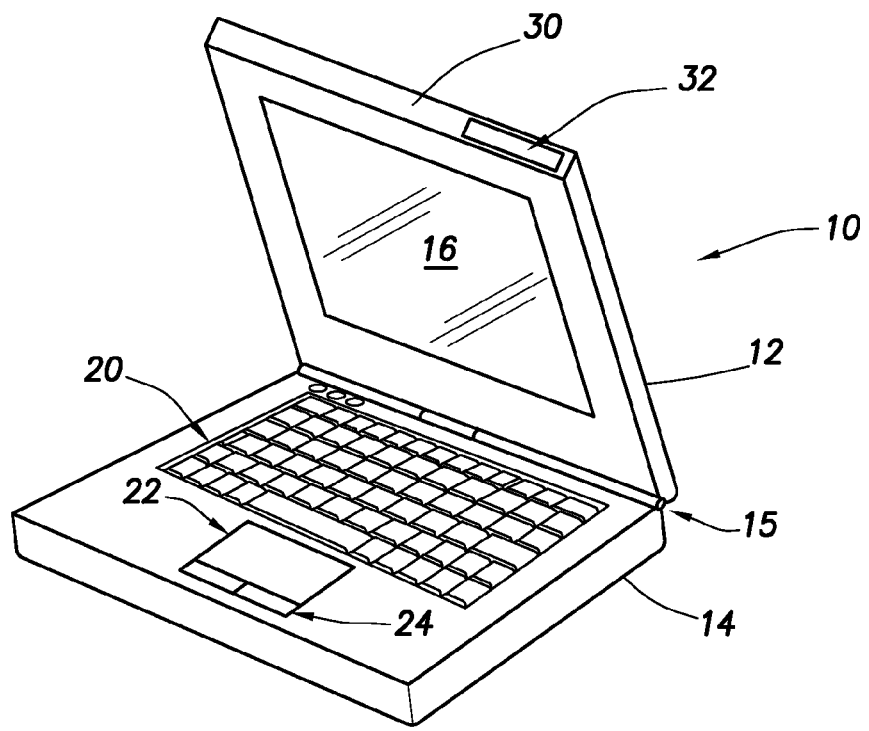
FIG. 1 shows a system in accordance with various embodiments.

As shown in FIG. 1, a system 10 is shown in accordance with various embodiments. As shown, system 10 comprises a display lid 12 coupled to a keyboard housing 14 by way of a hinge 15. The embodiment of system 10 shown in FIG. 1 is a portable computer, but in other embodiments, system 10 can be implemented in the form of other systems as desired. The display lid 12 comprises a display 16 on which information is presented to a user of system 10. The keyboard housing 14 comprises a keyboard 20, a touch pad 22, and one or more selection devices, (e.g., buttons) 24. A user of system 10 uses the keyboard 20, touch pad 22, selection devices 24, and display 16 to launch and interact with applications running on the system 10.

Figure 2:
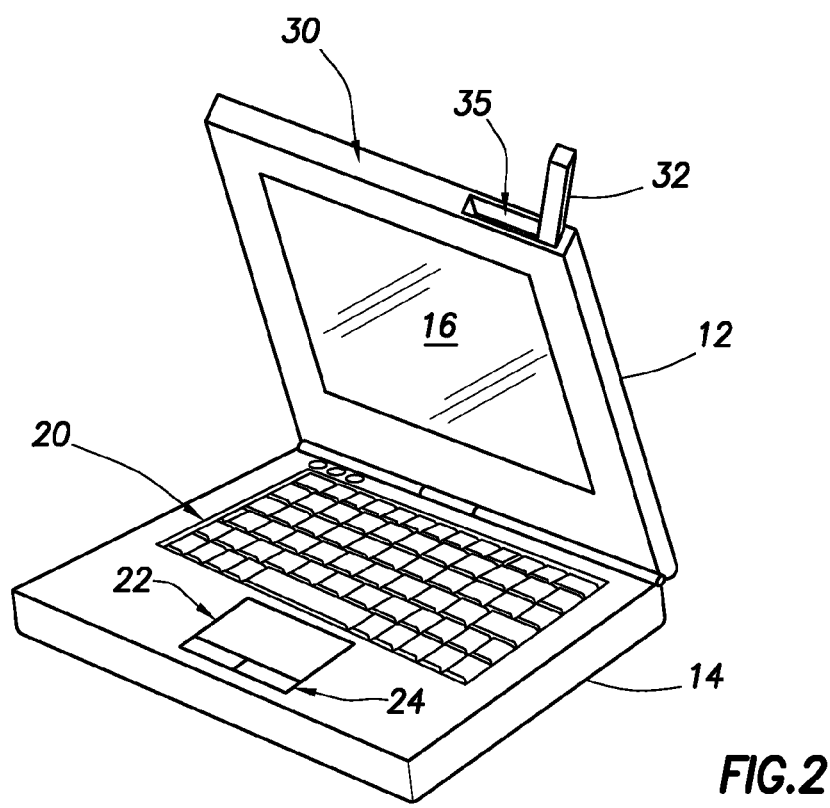
FIG. 2 shows the system of FIG. 1 in which an antenna has been deployed in accordance with various embodiments.

In accordance with various embodiments, system 10 comprises a wireless capability that is implemented at least in part, by an antenna 32. FIG. 1 illustrates antenna 32 as residing in a slot within a top surface 30 of display lid 12. FIG. 1 shows the antenna 32 in a stored configuration, while FIG. 2 shows the antenna 32 in a deployed position. Referring to FIG. 2, antenna 32 has been rotated to the deployed position from a slot 35 formed in the top surface 30 of display lid 12. Accordingly, the antenna 32 comprises a hinged antenna adapted to reside within a slot of the display lid. When a user desires to use the wireless capability of the system 10, the user rotates the antenna 32 to the deployed position as shown in FIG. 2.

Figure 5:
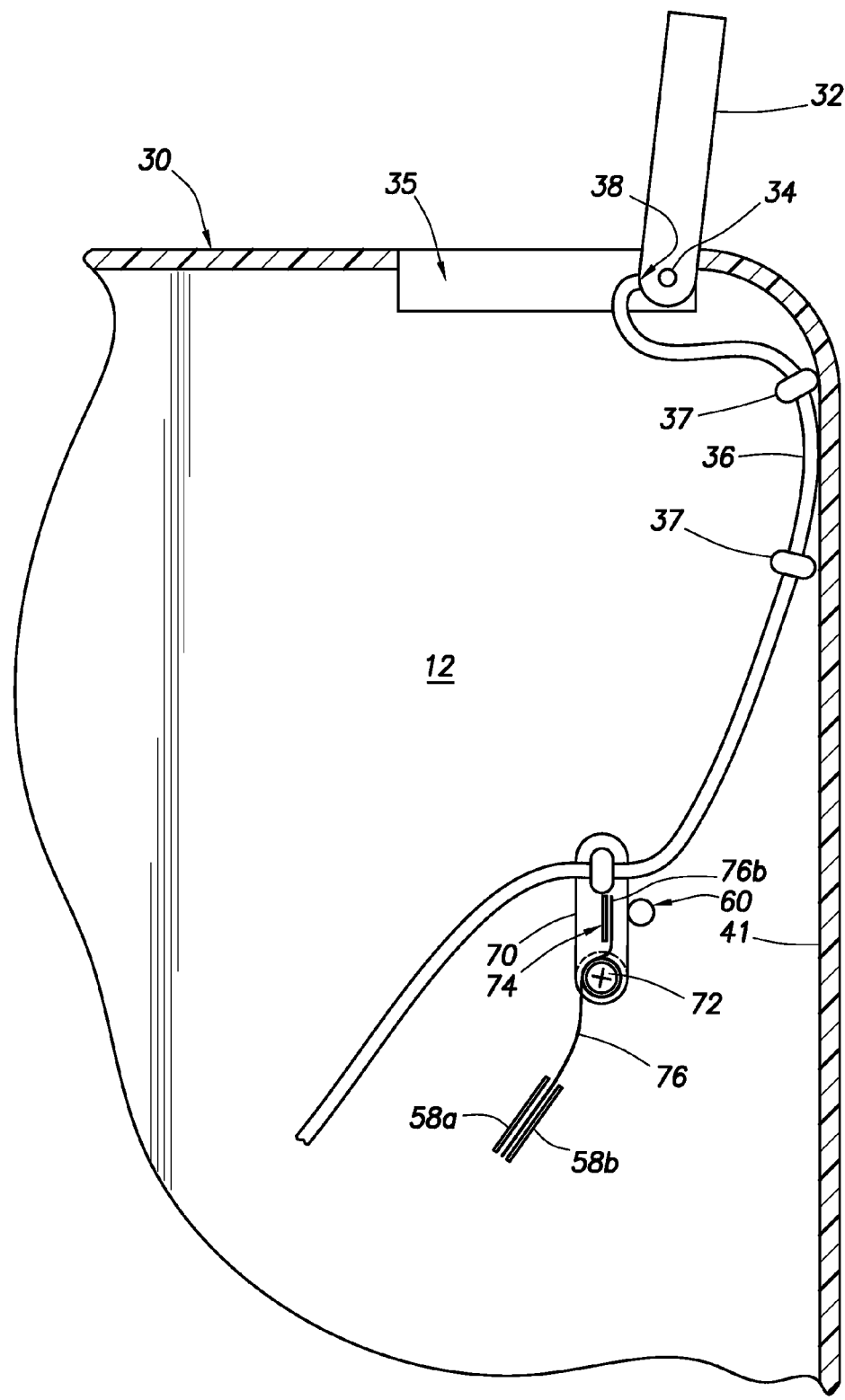

FIG. 3 shows a partial view of the inside of the display lid 12. In FIG. 3, the hinged antenna 32 is shown in its stored position within the slot 35 of the top surface 30. A pin 34 or other suitable mechanism is used to retain the hinged display in the slot 35 and to permit the hinged antenna 32 to rotate. Accordingly, the hinged antenna 32 rotates about a pivot point defined by pin 34. Referring briefly to FIG. 5, the hinged display 32 is shown in a deployed position having been rotated about pin 34.

Referring again to FIG. 3, an interior surface of display lid 12 comprises a post 50, a spring retention member 58, and a stop member 60 as shown. In some embodiments, the post 50, spring retention member 58 and stop member 60 are formed in or attached to an inner surface 13 of the display lid 12. The post 50 comprises a central bore 52 which, in some embodiments, is threaded. The spring retention member 58 comprises a pair of generally parallel walls 58a and 58b. The parallel walls 58a, 58b are adapted to receive one end of a spiral spring.

Referring to FIG. 4, a rotatable bracket 70 is shown attached to post 50. The rotatable member 70 is attached to post 50 by way of a screw 72 in inserted through a hole in the rotatable member 70 and threaded into the threaded bore 52 of the post 50. The end 71 of the rotatable member 70 opposing the end of the rotatable member 70 attached to the post 50 is permitted to rotate in a clockwise or counter-clockwise direction as indicated by arrow 73.

An electrical cable 36 is shown attached to the hinged antenna 32 at a location 38 on the antenna. The electrical cable 36 provides electrical signals to the antenna to be transmitted via wireless communications and/or receives electrical signals from the antenna 32. The electrical cable 36 electrically couples the hinged antenna to a transceiver (not shown) in system 10. The electrical cable 36 is routed in various embodiments along an inner surface 41 of the display lid 12. One or more retaining clips 37 are provided to retain electrical cable 36 along the inner edge. The electrical cable 36 is able to slide through the retaining clips 37 generally in a direction indicated by arrow 43. The electrical cable 36 is routed through a retaining clip 79 provided on the rotatable member 70. The retaining clip 79 exerts enough pressure on the electrical cable 36 that the cable is generally unable to slide relative to the rotatable member 70.

FIG. 4 also illustrates the use of a biasing member 76. In the embodiment of FIG. 4, the biasing member 76 comprises a spiral spring. As used herein, a spiral spring is a spring formed from a relatively flat strip of metal or other suitable material and wound to form at least one loop. A spiral spring is loaded by torque about an axis normal to the plane of the spiral. In other embodiments, the biasing member 76 may comprise a member deformed from a natural state such that, unless retained in the deformed state the member would return towards its natural state.

The spiral spring 76 in the illustrative embodiment of FIG. 4 comprises two ends 76a and 76b. In 76a of the spiral spring 76 is retained between walls 58a and 58b. The spiral spring comprises one or more turns about the head of screw 72. The other end 76b of the spiral spring 76 is positioned adjacent retaining tab 74 provided on the rotatable member 70. In the embodiment of FIG. 4, the spiral spring 76 is wound about screw 72 in a clockwise fashion. As such, unless the ends 76a and 76b are retained in the places shown in FIG. 4 by walls 58a, 58b, and tab 74, the ends 76a and 76b would tend to move toward each other as indicated by arrow 80. Thus, the natural tendency of the spiral spring 76 is for the end 71 of the rotatable member 70 to rotate in a counter-clockwise fashion. Because the electrical cable 36 is restrained on the rotatable member 70 by way of retaining clip 79, as the end 71 of the rotatable member 70 rotates in a counter-clockwise fashion, the rotatable member 70 applies force generally pulling on cable 36 in a direction away from its connection point 38 to the hinged antenna 32. The spring constant associated with the spiral spring 76 is sufficient to apply enough tension on cable 36 so as to prevent the cable 36 from binding within the display lid 12 and/or slot 35. The tension applied to electrical cable 36 by rotatable member 70, however, is not so great as to pull the electrical cable 36 loose from its connection point 38 at the hinged antenna 32.

FIG. 5 shows the hinged antenna 32 in its deployed position. As the antenna 32 is rotated outward to its deployed position, the hinged antenna pulls upward on electrical cable 36 thereby causing the rotatable member 70 to rotate in a clockwise fashion as shown. The spring constant associated with the spiral spring 76 is not so great as to prevent antenna 32 from being easily rotated by a user to its deployed position as shown in FIG. 5. Stop member 60 provides a surface past which the rotatable member 70 cannot rotate in the clockwise direction. When the user desires to return hinged antenna 32 back to its stored location within slot 35, the action of spiral spring 76 causes the rotating member 70 to rotate in a counter clockwise fashion, thereby applying tension on electrical cable 36 and preventing the cable 36 from binding within the display lid 12.

One or more of the post 50, walls 58a and 58b, stop member 60, rotatable member 70, and biasing member 76 (e.g., spiral spring) thus form a cable tension mechanism. One or more components comprising the cable tension mechanism are formed from plastic, metal or other suitable material.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a hinged antenna adapted to reside within a slot;
   an electrical cable connected to said antenna; and
   a cable tension mechanism that receives said electrical cable from said antenna;
   wherein said cable tension mechanism pulls on said cable when said hinged antenna is in said slot and also when said hinged antenna is rotated to a deployed position at least partially outside said slot.

2. The system of claim 1 wherein further comprising a display lid in which said slot and hinged antenna are provided.

3. The system of claim 1 wherein said cable tension mechanism comprises a biasing member.

4. The system of claim 3 wherein said biasing member comprises a spiral spring.

5. The system of claim 3 wherein said biasing member comprises a member deformed from a natural state such that, unless retained in a deformed state, said member would return towards said natural state.

6. The system of claim 1 wherein said cable tension mechanism comprises a member coupled to a housing.

7. The system of claim 6 wherein at least a portion said cable tension mechanism is rotatable about a pivot point inside said housing when said hinged antenna is deployed from, and stowed in, said slot.

8. The system of claim 7 further comprising a stop member past which the cable tension mechanism cannot pivot.

9. The system of claim 1 further comprising a stop member past which the cable tension mechanism cannot rotate.

10. The system of claim 1 wherein said system comprises a computer.

11. A system, comprising:
    a display lid;
    a hinged antenna that resides within a slot in said display lid;
    a keyboard housing to which said display lid is coupled; and
    a cable tension mechanism that pulls on an electrical cable from said antenna when said hinged antenna is in said slot and also when said hinged antenna is rotated to a deployed position at least partially outside said slot.

12. The system of claim 11 wherein said cable tension mechanism comprises a biasing member.

13. The system of claim 12 wherein said biasing member comprises a spiral spring.

14. The system of claim 12 wherein said biasing member comprises a member deformed from a natural state such that, unless retained in a deformed state, said member would return towards said natural state.

15. The system of claim 11 wherein said cable tension mechanism comprises a member coupled to said keyboard housing.

16. The system of claim 15 wherein at least a portion of said cable tension mechanism is rotatable about a pivot point inside said housing when said hinged antenna is deployed from, and stowed in, said slot.

17. A system, comprising:
    means for rotatably retaining an antenna; and
    means for tensioning an electrical cable from said rotatable antenna when said antenna is rotated to any of a plurality of positions.

18. The system of claim 17 further comprising means for rotatably retaining said means for tensioning.

19. The system of claim 18 further comprising means for stopping rotation of said means for tensioning.

20. The system of claim 17 wherein said means for tensioning is for biasing said electrical cable away from said antenna.

* * * * *